(No Model.)

J. E. WARD.
NUT LOCK.

No. 571,871. Patented Nov. 24, 1896.

Witnesses
Jos. Gregory
K. A. Dean

Inventor
John E. Ward
By John Wedderburn
his Attorney

UNITED STATES PATENT OFFICE.

JOHN EDWIN WARD, OF WAVERLY, NEW YORK.

NUT-LOCK.

SPECIFICATION forming part of Letters Patent No. 571,871, dated November 24, 1896.

Application filed January 27, 1896. Serial No. 576,996. (No model.)

*To all whom it may concern:*

Be it known that I, JOHN EDWIN WARD, a citizen of the United States, residing at Waverly, in the county of Tioga and State of New York, have invented certain new and useful Improvements in Nut-Locks; and I do hereby declare the following to be a full, clear, and exact description of the invention, such as will enable others skilled in the art to which it appertains to make and use the same.

This invention relates to certain new and useful improvements in nut-locks, and has for its object, among others, to provide a simple and cheap construction applicable to any and all forms of bolts and by which the turning of the nut will be effectually prevented. It embodies in its broadest sense a plate or washer adapted to loosely embrace the bolt and against which the nut is to be screwed, the face of said plate or washer toward the nut being provided with an annular groove, one end of which is extended out to the face of the plate or washer and into which is adapted to be driven a nail or other device of a flexible nature, the head of which is adapted to engage the nut and prevent retrograde movement thereof, and the other end of the nail or fastening device being beveled and adapted to make a complete circle and to wedge itself against the portion of the nail or fastening entering the said groove from the outer edge of the plate or washer. When adapted for employment in connection with a wooden timber or rail or other smooth surface, I form the face of the plate or washer with a teat or projection adapted to be embedded therein.

Other objects and advantages of the invention will hereinafter appear, and the novel features thereof will be particularly pointed out in the appended claims.

The invention is clearly illustrated in the accompanying drawings, which, with the letters of reference marked thereon, form a part of this specification, and in which—

Figure 1:
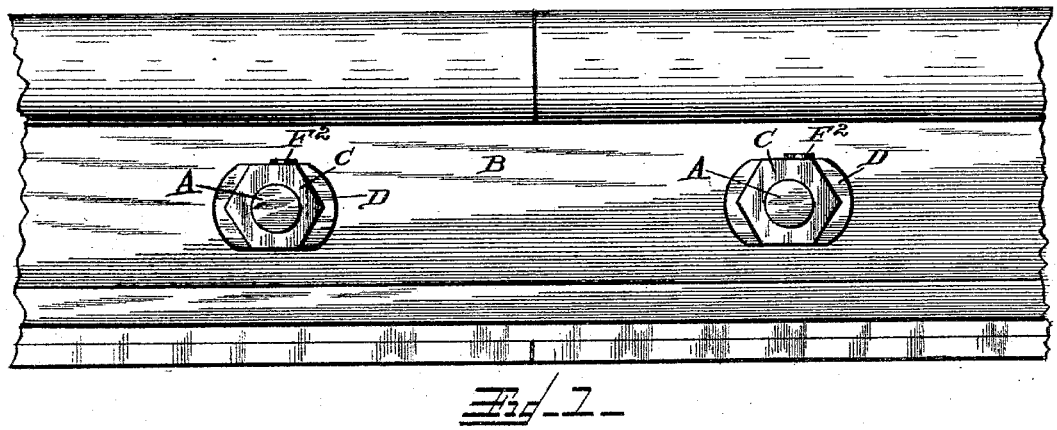
Figure 2:
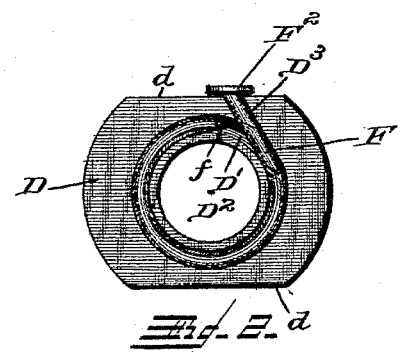
Figure 3:
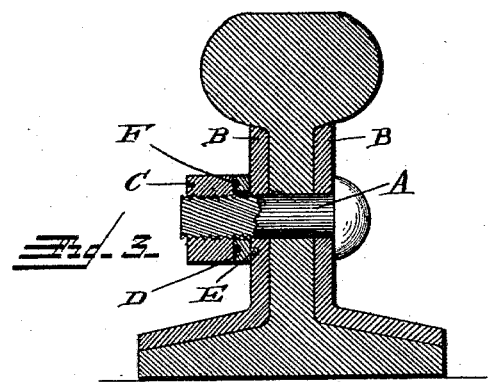
Figure 4:
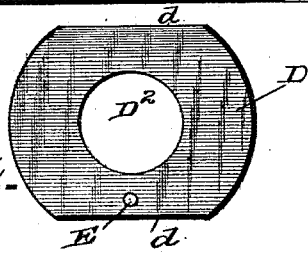

Figure 1 is an elevation showing the application of my improvement. Fig. 2 is a face view of the washer. Fig. 3 is a section through the rail, bolt, washer, and nut. Fig. 4 is a face view of the washer.

Like letters of reference indicate like parts in the several views.

Referring now to the details of the drawings by letter, A designates the bolt, B the fish-plate or other object, and C the nut, of ordinary construction.

D is my improved plate or washer, which may assume any desired shape, but preferably of that shown, having its opposite sides flattened, as seen at $d$, and upon one side formed with an annular groove D', encircling the bolt-opening $D^2$ therein. This groove is open at one end, as seen at $D^3$, so as to afford communication therewith from the outer face of the plate or washer.

The face of the plate or washer opposite that in which the groove is formed may be provided with a teat or projection or pin $e$ to prevent turning of the plate or washer.

In practice the plate or washer is placed upon the bolt and the nut screwed as far as may be desired. Then a wire nail or other suitable device F, having its inner end beveled or tapered, as seen at $f$, is driven into the opening leading into the groove of the plate or washer until its head $F^2$ engages one of the faces of the nut, and the latter is thus prevented from retrograde movement. The nail or other fastening is of such a length as to make one complete circle around the opening in the plate or washer and to have its tapered end wedged into the face between the entering outer end of the nail or fastening and the opposite adjacent wall of the groove therein. It is evident, of course, that the length of the nail should correspond with the size of washer employed and the circumference of the groove therein.

Modifications in detail may be resorted to without departing from the spirit of the invention or sacrificing any of its advantages.

Having thus described the invention, what is claimed as new is—

1. A washer having a bolt-opening and an annular groove in one face surrounding the same, combined with a flexible fastening device adapted to surround the bolt in said groove and to wedge itself against the entering portion thereof, said groove having a coöperating opening substantially as described.

2. A washer having a bolt opening and an annular groove in one face surrounding the same, combined with a flexible fastening device adapted to surround the bolt in said groove and to wedge itself against the entering portion thereof, said groove opening out upon one side of the plate or washer, substantially as described.

3. A washer having a bolt-opening and an annular groove in one face surrounding the same, said groove opening out upon one side of the plate or washer, and having a teat or projection upon its opposite face combined with a bendable fastening device inserted in said opening and having its inner end tapered to form a wedge against the portion thereof entering the groove, substantially as described.

4. The combination with a bolt and the nut, of a washer having a bolt-opening and a groove surrounding the same and opening out upon one face of the washer and a flexible fastening device, adapted to be driven into said opening and to make a complete circle in said groove and to have its inner end wedged between the outermost portion of the fastening and the opposite adjacent wall of the groove, substantially as described.

In testimony whereof I have signed this specification in the presence of two subscribing witnesses.

JOHN EDWIN WARD.

Witnesses:
WM. L. FORD,
LOUIS G. RANDALL.